United States Patent Office 2,982,386
Patented May 2, 1961

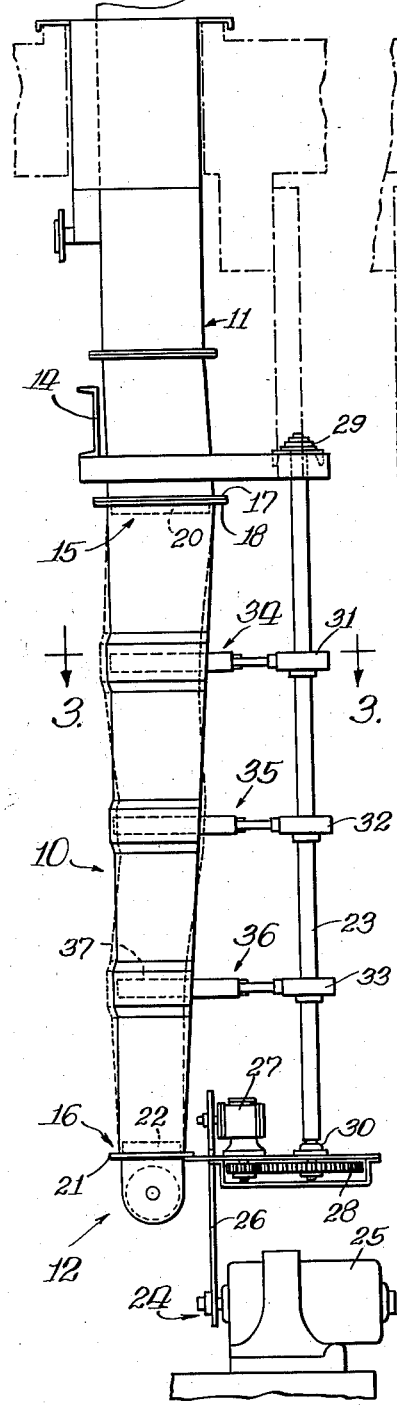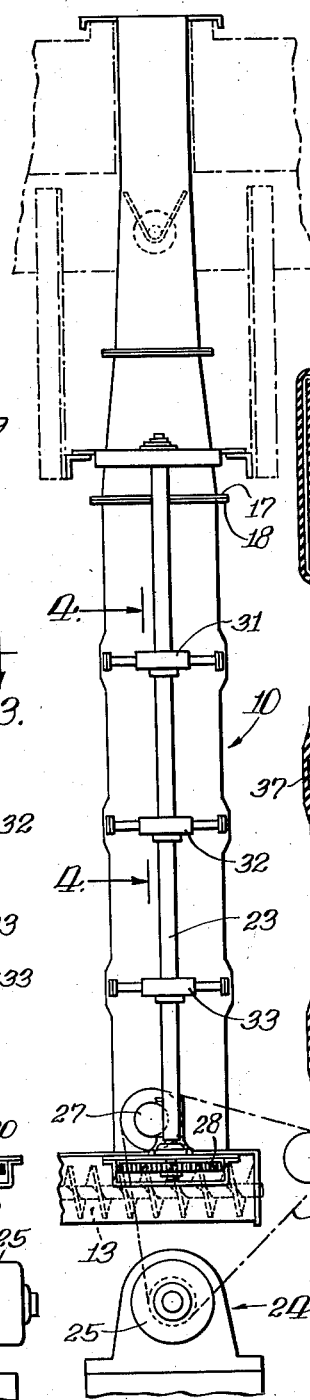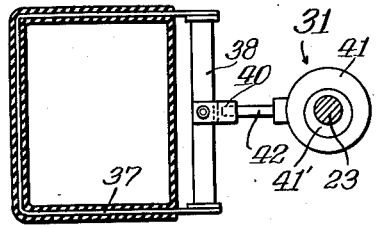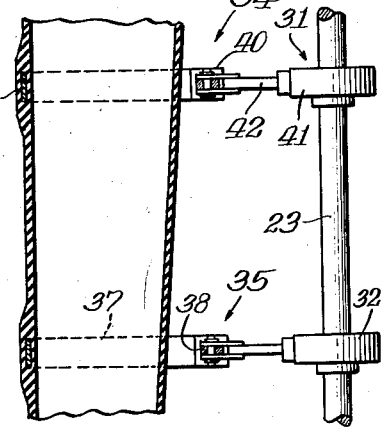

2,982,386

FLEXIBLE CHUTE

Ronald F. Hansing, Elkhart, Ind., assignor to Miles Laboratories, Inc., Elkhart, Ind., a corporation of Indiana Filed Nov. 21, 1957, Ser. No. 697,925

1 Claim. (Cl. 193—25)

This invention relates, in general, to conveying devices and, in particular, to an improved means for conveying wet crystals which are formed in one step of a process of manufacture.

A general object of this invention is to provide a new and improved wet crystal conveying device for delivering wet crystals from one mechanism, such as a centrifuge, to another mechanism, such as a screw feeding mechanism for a dryer.

Heretofore, conventional practice prescribed the use of a metal chute for delivering or conveying wet crystals from, for example, a centrifuge, to, for example, a screw conveyor for a dryer, in a process of manufacture. Such conventional metal chutes have proven unsatisfactory in the processing of wet crystals in that a small percentage of wet crystals usually clung to the sides of the chute to cause a "bridging" of the crystals over the outlet of the chute. With each discharge into the inlet of the chute from the centrifuge, an accumulation built up on the bridged crystals and eventually plugged or congested the outlet opening of the chute.

Vibrators usually attached to the chute were not always effective in relieving the congestion and if the vibrator failed to dislodge the accumulation, the operator would usually then pound the chute with a hammer. Quite often, also, this pounding or hammering failed and left no alternative but to shut down operation, remove the accumulated crystals through a clean out port in the chute. Pounding on the chute also resulted in the destruction of a portion of the chute and necessitated replacement thereof usually every six to nine months.

Obviously, also another defect in conventional metal chutes for conveying wet crystals was that to maintain a flow of materials through the metal chute, there would be required the constant attention of an operator. Furthermore, the material, cleaned out of the chute, after it had been accumulated, could not be used and had to be re-processed through evaporation and crystallization operations.

Accordingly, still another object of my invention is to improve chutes or conveyors of wet crystals by overcoming all of the defects of the conventional metal chutes.

I contemplate the fulfilling of these general objects by the installation of a flexible chute comprising a hollow rectangular flexible material with an inlet port at one end and a discharge port at the other end, anchored in place by rigidly supported metal flanges embedded in the material at each end of the chute. I also provide a mechanical flexing of the chute by an oscillating means comprising an elongated drive shaft rotated by a suitable driving mechanism and parallel to the center line of the chute with a plurality of adjustable eccentric thrust bearings mounted thereon and equally spaced throughout the length of the chute. The eccentric bearings are connected to the chute for the flexing operation by the provision of a U-shaped bracket embedded in the chute side walls and connected to the eccentric bearing means by tie rods.

Accordingly, still another object of my invention is a new and improved wet crystal conveying chute made of a flexible material which is flexed by an oscillating means to prevent the crystals from bridging or accumulating in the chute.

Still another object of my invention is a new and improved wet crystal conveying chute particularly adapted to be disposed between the discharge of a centrifuge and the inlet of a screw conveyor to a drying means, particularly characterized by being rigidly supported at the bottom of the hopper from the centrifuge and the top of the screw conveyor and provided with equally spaced oscillating means for flexing the chute and preventing the bridging and accumulation of crystals therein.

Still another object of my invention is a new and improved wet crystal conveying chute whereby wet crystals being conveyed therethrough are prevented from clinging to the sides of the chute and are prevented from bridging over the outlet to prevent an accumulation thereof.

Other and more particular objects of my invention will be apparent to those skilled in the art from the following description and drawings forming a part hereof and wherein:

Fig. 1 is a side elevational view illustrating to advantage the flexible chute constructed in accordance with the teachings of my invention;

Fig. 2 is a front elevational view of the chute illustrated in Fig. 1;

Fig. 3 is a cross-sectional view of the flexible chute taken along lines 3—3 of Fig. 1 and looking in the direction of the arrows;

Fig. 4 is a view of the flexible chute taken along line 4—4 of Fig. 2 and looking in the direction of the arrows.

Referring now to the drawings and in particular to Figs. 1 and 2, there is illustrated my new and improved wet crystal conveyor or chute, indicated in its entirety as 10, disposed in operative position beneath a hopper, indicated in its entirety as 11, from a suitable mechanism, such as the centrifuge (not shown) and located above a feed mechanism or screw conveyor, indicated in its entirety as 12, to a dryer (not shown). In operation, wet crystals introduced into the top of the hopper or bin 11 will travel through the chute 10 into the screw conveyor 12 to be transported by the screw mechanism 13 thereof into the dryer. Since the hopper 11, its usual supports 14, and the screw conveyor 12 are conventional and well-known, no further description thereof is deemed necessary herein.

My new and improved flexible chute 10 overcomes the difficulties of the prior art and comprises a generally long, hollow, tapered, flexible tube of rubber or any suitable resilient material, natural or synthetic, and rectangular in cross-section with a relatively large rectangular inlet 15 and a relatively small rectangular outlet 16. Inlet 15 is anchored to a lower flange portion 17 of the hopper 11 by a similar flange portion 18 having one side portion 20 embedded in the side walls of the chute as illustrated. In this manner, the rectangular inlet 15 is rigidly supported. Similarly, outlet 16 is anchored to the inlet of the conveyor 12 by a flange portion 21 with side portion 22 embedded in the side walls of the chute. In such a manner, as in connection with the inlet 15, the outlet 16 is rigidly supported.

In order to suitably flex the chute or conveyor to prevent the sticking of the wet crystals and an accumulation thereof in the chute, means are provided to flex the chute. Such flexing means comprises, generally, a vertical shaft 23 disposed parallel to the center line of the chute and rotatably connected to be driven by driving means, indicated in its entirety as 24 and comprising an electric motor 25, a drive chain 26, speed reducing means 27 and gear box 28. The ends of the shaft 23 are provided with suitable bearing means 29 and 30, and intermediate the ends thereof there is provided a plurality of eccentric bearing means 31, 32, 33 equally spaced throughout the length of the chute. Each such bearing means is connected to the chute by an attaching means, each of which is respectively indicated in its entirety as 34, 35, 36. It is to be understood that while I have shown three eccentric bearing means and three attaching means, any number of such means may be employed.

Turning now to Figs. 3 and 4 where eccentric means 31 and attaching means 34 are illustrated in detail, it can be seen that attaching means 34 comprises a U-shaped bracket 37 having relatively thin, relatively flat, side walls embedded in the side walls of flexible chute as illustrated to advantage in Fig. 3. The ends of the bracket are apertured to receive the bar 38 which in turn is apertured, centrally thereof, for a clevis connection 40. Clevis connection 40 is in turn threadably connected to a cam follower comprising the outer eccentric 41 of the eccentric bearing means 31 by a tie rod 42. The outer eccentric 41 is provided with a circular opening therein for receiving a circular cam 41' eccentrically mounted on said shaft 23. Thus, by rotation of the shaft 23 by the driving means 24, that portion of the chute near the bracket 37 will be moved to the right and to the left as illustrated in Fig. 1. Obviously, with the other eccentric bearing means 32, 33 and attaching means 35, 36 being similar in construction and operation to eccentric bearing means 31 and attaching means 34, that portion of the flexible chute near the latter means will be moved. The amount of eccentricity of the bearings as well as the relative center of the eccentrics thereof with respect to each other will govern the amount of flexing of the chute, as illustrated in Fig. 1. It is important to note that the action of the eccentrics is a relatively slow motion as compared to the vibrators normally attached to the conventional chutes.

Thus, it can be seen that I have disclosed a flexible chute which has overcome the defects of the prior art chutes used in wet crystal processing.

Wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claim which should be construed as broadly as the prior art will permit.

I claim:

A chute for guiding the descent from one mechanism to another of wet crystals, comprising an elongate rubber tube immovably fixed at its upper end to the one mechanism and at its lower end to the other, a plurality of brackets imbedded in said tube in spaced relation to one another longitudinally of the tube for retaining the tubular configuration thereof, a rotatable shaft generally paralleling said tube, a plurality of cams mounted eccentrically on said shaft in longitudinally spaced relation to one another, said cams being aligned transversely of said tube with respective ones of said brackets, and a cam follower connected to each of said brackets and operatively engaged with the respective one of said cams for transversely flexing said tube upon rotation of said shaft.

References Cited in the file of this patent

UNITED STATES PATENTS

| | | |
|---|---|---|
| 1,476,224 | Salfisberg | Dec. 4, 1923 |
| 2,028,219 | Johnson | Jan. 21, 1936 |
| 2,404,884 | Pieper | July 30, 1946 |
| 2,568,332 | Genovese | Sept. 18, 1951 |
| 2,696,285 | Zenlea | Dec. 7, 1954 |